US012451829B2

United States Patent
Albers et al.

(10) Patent No.: US 12,451,829 B2
(45) Date of Patent: Oct. 21, 2025

(54) VARIABLE FREQUENCY DRIVE SYNCHRONOUS RELUCTANCE MOTOR SYSTEM WITH VOLTS-PER-HERTZ CONTROL

(71) Applicant: Nidec Motor Corporation, St. Louis, MO (US)

(72) Inventors: Timothy R. Albers, St. Charles, MO (US); Eric Coupart, Clayton, MO (US); Michael L. McClelland, Champniers (FR); Sheng-Chan Yen, Tainan (TW); Guo-Jhih Yan, Tainan (TW); Ta-Yin Luo, Tainan (TW); Yu-Wei Hsu, Tainan (TW); Pei-Chun Shih, Tainan (TW); Cheng-Tsung Liu, Kaohsiung (TW)

(73) Assignee: Nidec Motor Corporation, St. Louis, MO (US)

( * ) Notice: Subject to any disclaimer, the term of this patent is extended or adjusted under 35 U.S.C. 154(b) by 164 days.

(21) Appl. No.: 18/573,307

(22) PCT Filed: Jun. 22, 2022

(86) PCT No.: PCT/US2022/034562
§ 371 (c)(1),
(2) Date: Dec. 21, 2023

(87) PCT Pub. No.: WO2022/271854
PCT Pub. Date: Dec. 29, 2022

(65) Prior Publication Data
US 2024/0291412 A1 Aug. 29, 2024

Related U.S. Application Data

(60) Provisional application No. 63/213,446, filed on Jun. 22, 2021.

(51) Int. Cl.
*H02P 25/092* (2016.01)
*H02P 27/04* (2016.01)

(52) U.S. Cl.
CPC .......... *H02P 25/092* (2016.02); *H02P 27/047* (2013.01)

(58) Field of Classification Search
CPC ........ H02P 25/092; H02P 27/047; H02P 6/08; H02K 1/246; H02K 19/14
(Continued)

(56) References Cited

U.S. PATENT DOCUMENTS 5,818,140 A 10/1998 Vagati
9,806,657 B2 * 10/2017 Barrass ................. H02K 1/246
(Continued)

FOREIGN PATENT DOCUMENTS

CN 102761184 10/2012
CN 104901452 B 10/2017
(Continued)

OTHER PUBLICATIONS

International Search Report and Written Opinion for PCT Application No. PCT/US2022/034562 (Dated Oct. 17, 2022).

*Primary Examiner* — David Luo
(74) *Attorney, Agent, or Firm* — Hovey Williams LLP

(57) ABSTRACT

A variable frequency drive motor system and method with a single variable frequency drive controller controlling multiple synchronous reluctance motors in an open-loop mode using volts-per-Hertz control. Each motor includes a rotor including three or more curved, spaced-apart barrier slots extending longitudinally through each quadrant of the rotor. The rotor also includes a conductive cage including a plurality of conductive rotor bars contained within the barrier slots and also extending longitudinally through each quadrant, and conductive end rings located at opposite ends (Continued)

of the rotor and electrically connected to the respective ends of the rotor bars. The controller controls speed and torque by varying input frequency and voltage in an open-loop mode by adjusting the voltage magnitude of an inverter's output to each motor to match a required load torque in a volts-per-Hertz relationship. An operator interface allows for starting, stopping, adjusting, and otherwise controlling the operation of each motor.

20 Claims, 10 Drawing Sheets

(58) Field of Classification Search
USPC .................................................. 318/701, 700
See application file for complete search history.

(56) References Cited

U.S. PATENT DOCUMENTS

| 10,523,099 | B2 | 12/2019 | Haussmann et al. |
| 2005/0140236 | A1 | 6/2005 | Jeong et al. |
| 2009/0224624 | A1 | 9/2009 | Kumar et al. |
| 2013/0043745 | A1 | 2/2013 | Hussain et al. |
| 2016/0056674 | A1 | 2/2016 | Büttner et al. |
| 2017/0214352 | A1 | 7/2017 | Gontermann et al. |
| 2020/0318645 | A1 | 10/2020 | Rollins et al. |
| 2022/0407372 | A1 | 12/2022 | Yen et al. |

FOREIGN PATENT DOCUMENTS

| CN | 207782517 U | 8/2018 |
| EP | 3836354 | 6/2021 |
| JP | 2006020376 A | 1/2006 |

* cited by examiner

Low Load Position

High Load Position

VARIABLE FREQUENCY DRIVE SYNCHRONOUS RELUCTANCE MOTOR SYSTEM WITH VOLTS-PER-HERTZ CONTROL

RELATED APPLICATIONS

This is a National Phase Application pursuant to 35 U.S.C. § 371 of International Application No. PCT/US2022/034562 filed Jun. 22, 2022, which relates to and claims priority benefit of an earlier-filed U.S. provisional patent application titled INVERTER-FED SINGLE AND MULTIPLE SYNCHRONOUS MOTOR SYSTEMS WHICH USE A SIMPLE VOLTS PER HERTZ CONTROL, Ser. No. 63/213,446, filed Jun. 22, 2021. The entire contents of each of the identified earlier-filed applications is hereby incorporated by reference as if fully set forth herein.

FIELD

The present invention relates to systems and methods for controlling synchronous reluctance motors, and more particularly, embodiments concern a variable frequency drive motor system and method with a single variable frequency drive controller controlling one or more synchronous reluctance motors in an open-loop mode using volts-per-Hertz control.

BACKGROUND

A variable-frequency drive (or adjustable-frequency drive or variable-voltage/variable-frequency drive) is a type of motor drive used in electro-mechanical drive systems to control alternating current motor speed and torque by varying motor input frequency and voltage. Variable frequency drives are commonly used with low-cost, low-efficiency three-phase induction motors in applications ranging from small appliances to large compressors.

In synchronous reluctance motors, operation of the rotor, particularly during starting, requires vector control and a significant amount of tuning for successful operation. Conventional synchronous motors are current-fed, and the variable frequency drive vectors the stator currents to be synchronous with the rotor based on the known position of the rotor. The rotor position is determined using an angular position sensor, such as an incremental encoder, or by calculating the rotor position from measured voltage and current. Such vector control is necessary to achieve stable operation of the motor with a closed-loop control, and requires a single, dedicated variable frequency drive for each motor.

This background discussion is intended to provide information related to the present invention which is not necessarily prior art.

SUMMARY

Embodiments of the present invention solve the above-described and other problems and limitations in the prior art by providing a variable frequency drive motor system and method with a single variable frequency drive controller controlling one or more synchronous reluctance motors in an open-loop mode using volts-per-Hertz control.

In one embodiment, a variable frequency drive motor system comprises one or more synchronous reluctance motors and a variable frequency drive controller. Each synchronous reluctance motor may include a stator and a rotor, and each rotor may include a longitudinal axis and four quadrants circumferentially arranged about the longitudinal axis, a plurality of curved, spaced-apart barrier slots contained within each quadrant and extending parallel to the longitudinal axis, and a conductive cage. The conductive cage may include conductive material located in at least some of the plurality of curved, spaced-apart barrier slots to create a plurality of curved, spaced-apart conductive rotor bars contained within each quadrant and extending parallel to the longitudinal axis between a first end and a second end, and first and second conductive end rings may be located at longitudinally opposite ends of rotor, with the first conductive end ring in electrical contact with the first end of the plurality of curved, spaced-apart conductive rotor bars and the second conductive end ring in electrical contact with the second end of the plurality of curved, spaced-apart conductive rotor bars. The variable frequency drive controller may include an inverter and may be configured to control a speed and a torque of the one or more synchronous reluctance motors by varying a motor input frequency and a voltage in an open-loop mode by adjusting the voltage magnitude of an output of the inverter to each synchronous reluctance motor to match a required load torque in a volts-per-Hertz relationship.

In various implementations, the variable frequency motor drive motor system may include any one or more of the following additional features. The variable frequency drive motor system may be incorporated into a variable torque heating, ventilation, and air conditioning application. The variable frequency drive motor system may be incorporated into pumping applications, including booster pumps, swimming pools, well pumps, and jet pumps. Each conductive rotor bar may be a continuous curve, or each conductive rotor bar may be a portion of a curve interrupted by one or more walls. There may be at least three conductive rotor bars in each quadrant, or there may be between three and seven conductive rotor bars in each quadrant. The system may include a magnetic rotor bar located in one or more of the barrier slots in each quadrant. The variable frequency controller may include a rectifier bridge converter and a direct current link. The system may further include an operator interface configured to facilitate an operator starting, stopping, and adjusting the motor speed of each of the one or more synchronous reluctance motors.

Additionally, each of these system embodiments and implementations may be alternatively characterized as methods based on their functionalities.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment", "an embodiment", or "embodiments" mean that the feature or features referred to are included in at least one embodiment of the invention. Separate references to "one embodiment", "an embodiment", or "embodiments" in this description do not necessarily refer to the same embodiment and are not mutually exclusive unless so stated. Specifically, a feature, structure, act, etc. described in one embodiment may also be included in other embodiments, but is not necessarily included. Thus, particular implementations of the present invention can include a variety of combinations and/or integrations of the embodiments described herein.

Broadly, embodiments provide a variable frequency drive (VFD) motor system and method with a single VFD controller controlling one or more synchronous reluctance motors in an open-loop mode using volts-per-Hertz (V/Hz) control. Embodiments advantageously allow for replacing existing induction motors with synchronous motors, including in variable torque applications, which both increases overall efficiency and increases efficiency when a load is reduced and the application slows to match the required load with a lower output, and provides for both low- and high-speed stability. Further, embodiments advantageously allow for controlling the motors in an open-loop mode, which allows for controlling multiple motors on the same VFD using V/Hz control. Potential applications include, for example, heating, ventilation, and air conditioning (HVAC) applications. Other potential applications include pumping applications, such as booster pumps, swimming pools, well pumps, and jet pumps.

Figure 1:
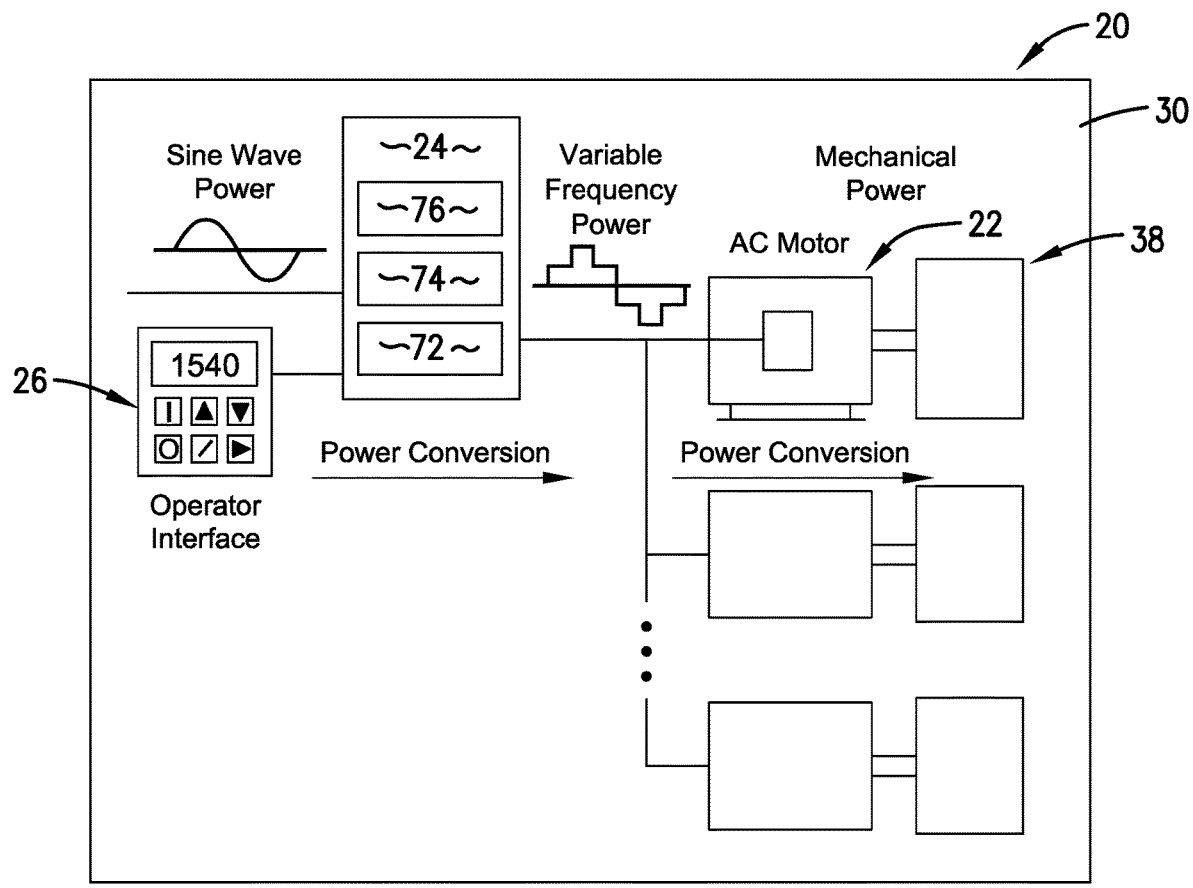
FIG. 1 is a high-level block diagram of an embodiment of a variable frequency drive motor system of the present invention, including one or more synchronous reluctance motors controlled by a single variable frequency drive controller.

Referring to FIG. 1, a VFD motor system 20 is shown comprising one or more synchronous reluctance motors 22, a VFD controller 24, and an operator interface 26. The system 20 may be employed in substantially any suitable application 30, such as, for example, an HVAC system, including variable torque applications which might ordinarily use induction motors. The one or more motors 22 may be multi-phase (for example, three-phase) alternating current (AC) synchronous reluctance motors. In one implementation, there may be a single motor, while in other implementations, there may be a plurality of similar or identical motors.

Figure 2:
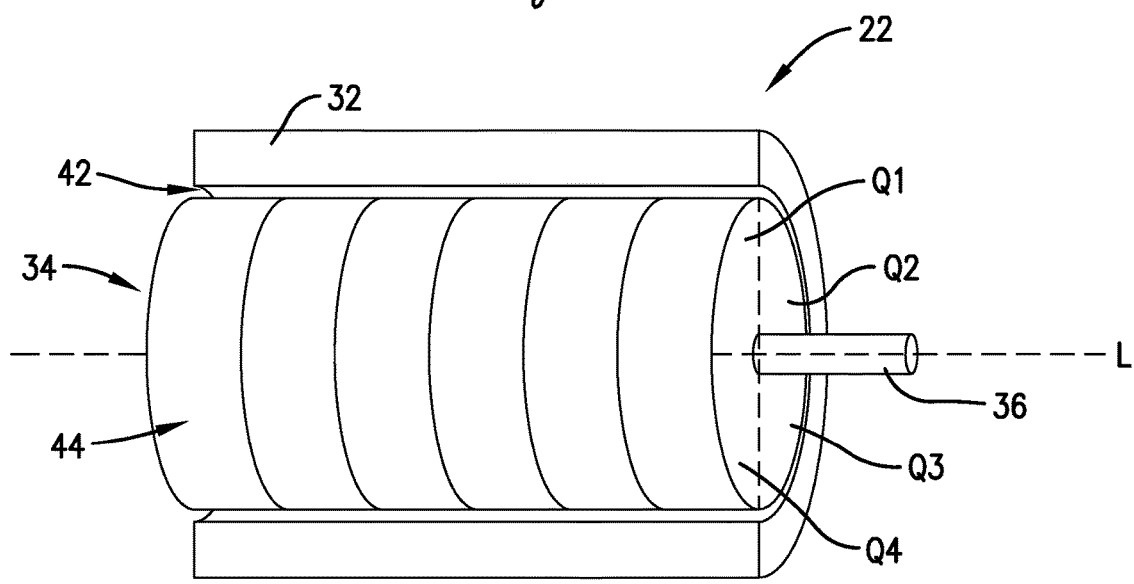
FIG. 2 is a cross-sectional perspective view of example stator, rotor, and shaft components of each motor of the system of FIG. 1.

Referring also to FIG. 2, each synchronous reluctance motor 22 may include a stator 32, a rotor 34, and a shaft 36 which may drive a load 38 (which may be, for example, a pump, fan, compressor, or blower). The stator 32 may be arranged substantially circumferentially about and separated from the rotor 34 by an air gap 42. In one implementation, the stator 32 may be of an otherwise substantially conventional stator design and function.

The rotor 34 may be substantially cylindrical in shape with a longitudinal axis L and four quadrants Q1, Q2, Q3, Q4 arranged circumferentially about the axis L. The illustrated implementation is a four-pole design and therefore the rotor has four regions (or quadrants); however, other implementations may have a greater or lesser number of poles and a correspondingly greater or lesser number of regions. In one implementation, the rotor 34 may include a plurality of rotor laminations 44 arranged transversely along the axis L. Referring also to FIGS. 3, 4A-4H, 5A, 5B, 6A, and 6B, the rotor 34 may include a plurality of curved, spaced-apart barrier slots 50 located within each quadrant Q1, Q2, Q3, Q4 and extending longitudinally through the rotor 34 in parallel with the axis L, from one end to an opposite second end of the rotor 34. In various implementations, there may be at least three such barrier slots 50 or between three and ten barrier slots 50 in each quadrant Q1, Q2, Q3, Q4. Larger diameter rotors may accommodate a higher number of barrier slots.

Figure 3:
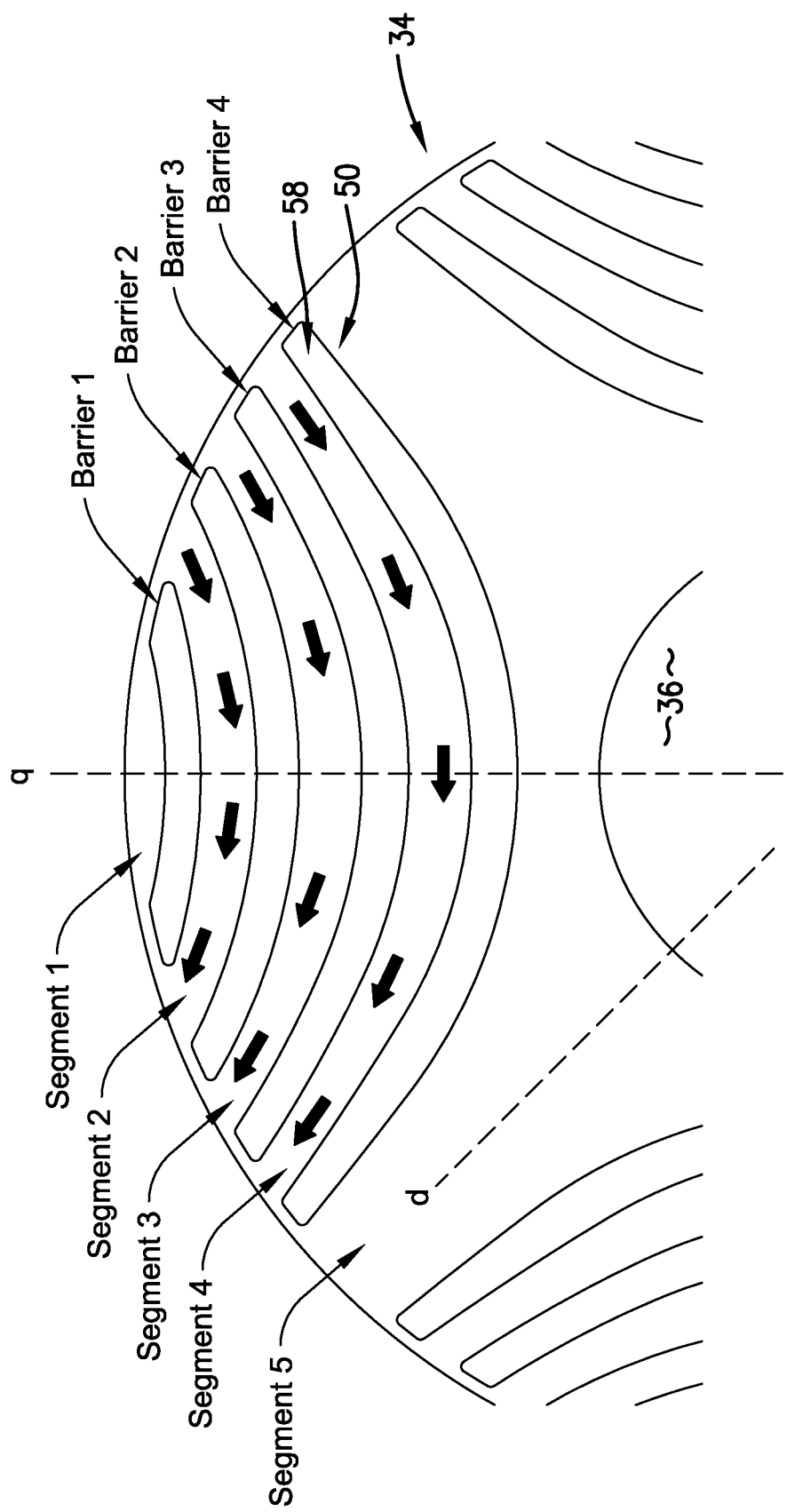
FIG. 3 is a fragmentary cross-sectional plan view of an example implementation of the rotor component of FIG. 2, showing a plurality of barrier slot and conductive rotor bar components.
Figure 4A:
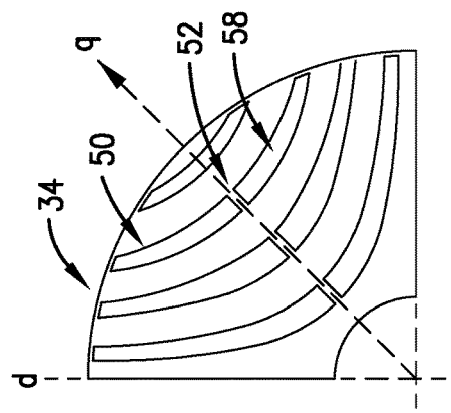
FIG. 4A is a fragmentary cross-sectional plan view of a first implementation of a plurality of conductive rotor bars in one quadrant of the rotor component of FIG. 2.
Figure 4B:
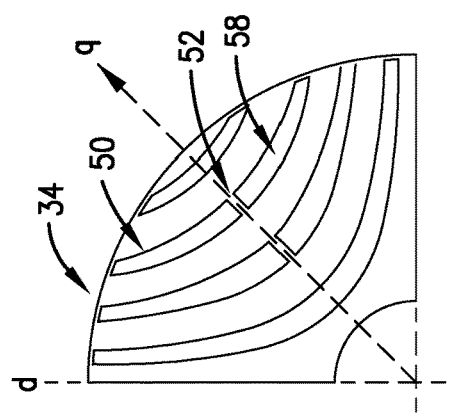
FIG. 4B is a fragmentary cross-sectional plan view of a second implementation of the plurality of conductive rotor bars in one quadrant of the rotor component of FIG. 2.
Figure 4C:
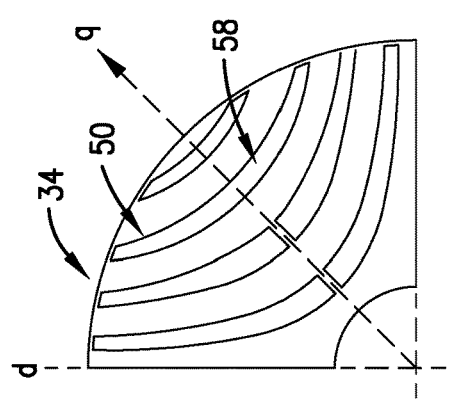
FIG. 4C is a fragmentary cross-sectional plan view of a third implementation of the plurality of conductive rotor bars in one quadrant of the rotor component of FIG. 2.
Figure 4D:
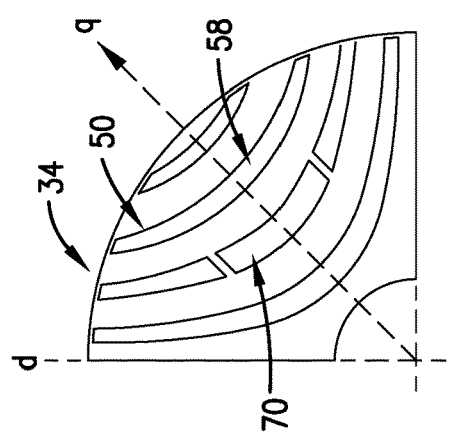
FIG. 4D is a fragmentary cross-sectional plan view of a fourth implementation of the plurality of conductive rotor bars in one quadrant of the rotor component of FIG. 2.
Figure 4E:
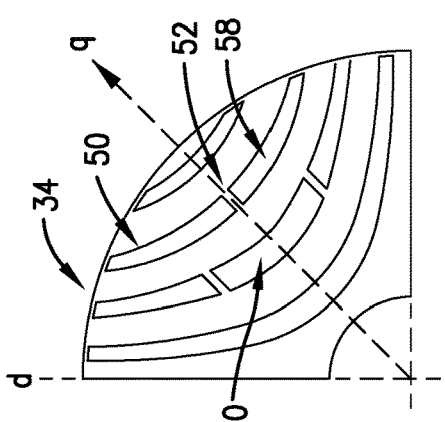
FIG. 4E is a fragmentary cross-sectional plan view of a fifth implementation of the plurality of conductive rotor bars in one quadrant of the rotor component of FIG. 2.
Figure 4F:
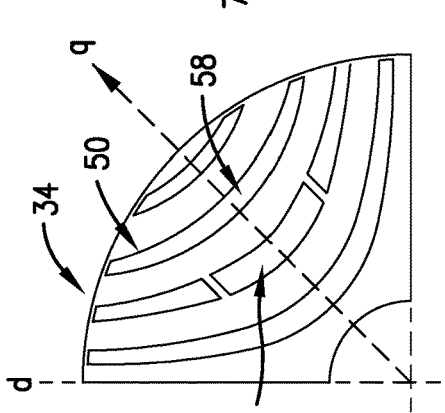
FIG. 4F is a fragmentary cross-sectional plan view of a sixth implementation of the plurality of conductive rotor bars in one quadrant of the rotor component of FIG. 2.
Figure 4G:
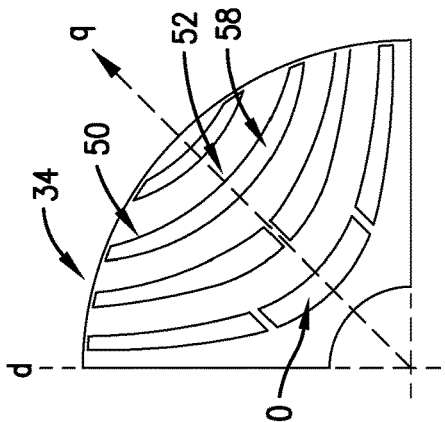
FIG. 4G is a fragmentary cross-sectional plan view of a seventh implementation of the plurality of conductive rotor bars in one quadrant of the rotor component of FIG. 2.
Figure 4H:
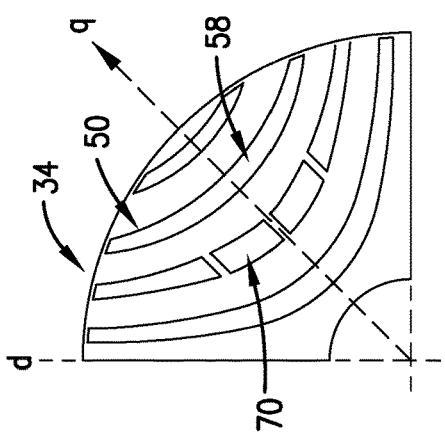
FIG. 4H is a fragmentary cross-sectional plan view of an eighth implementation of the plurality of conductive rotor bars in one quadrant of the rotor component of FIG. 2.
Figure 5A:
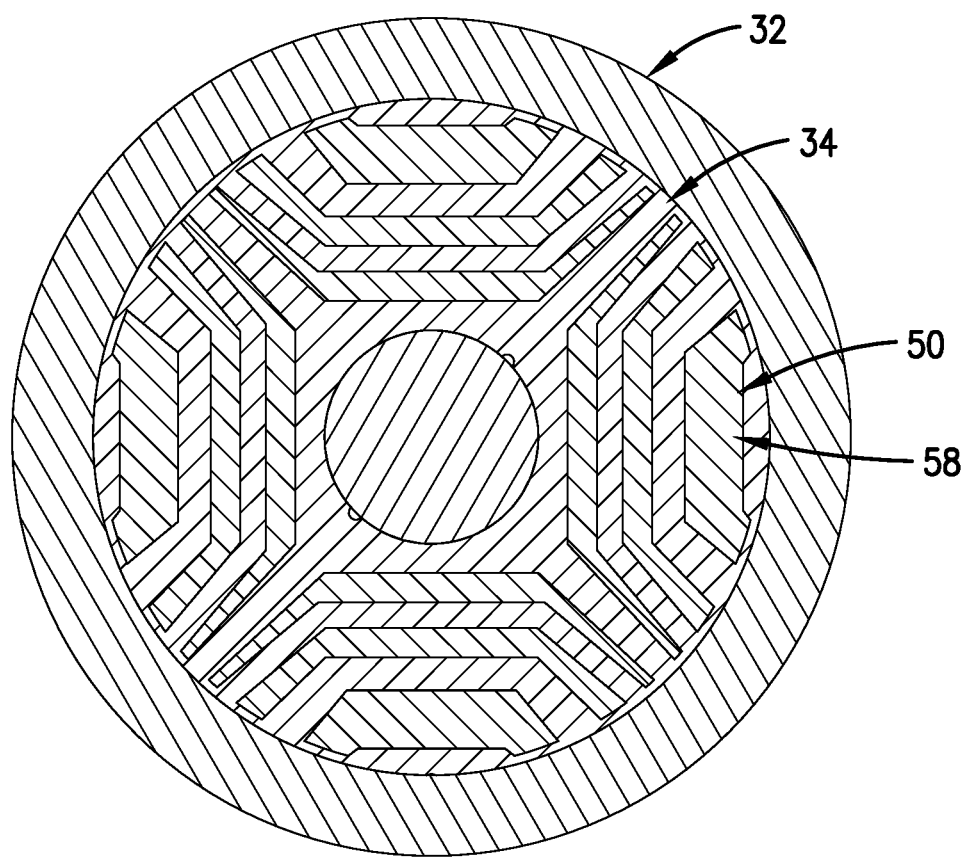
FIG. 5A is a cross-sectional plan view of a first implementation of a conductor cage component of the motor of FIG. 2.
Figure 5B:
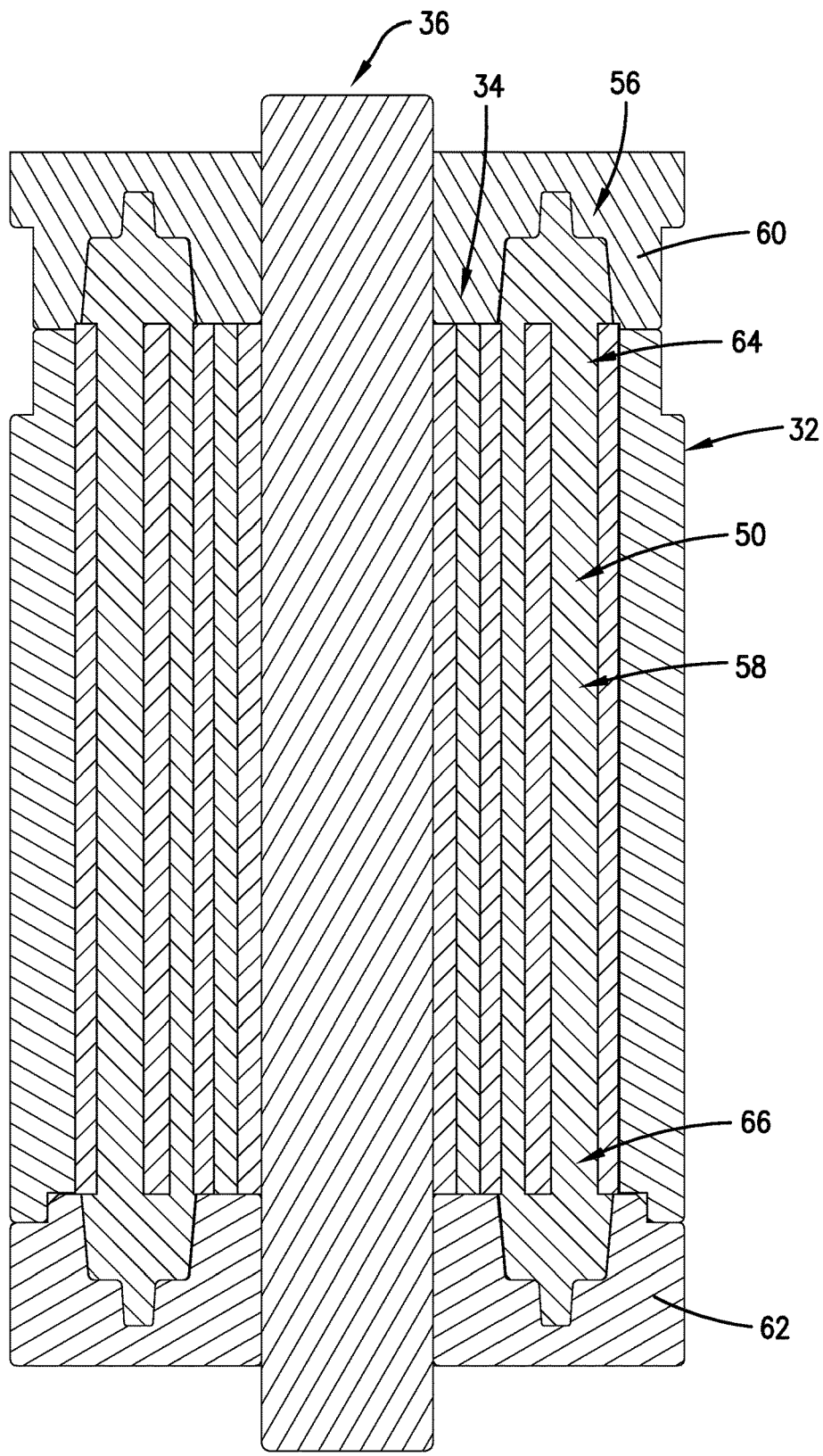
FIG. 5B is a cross-sectional elevation view of the first implementation of the conductor cage component of the motor of FIG. 5A.
Figure 6A:
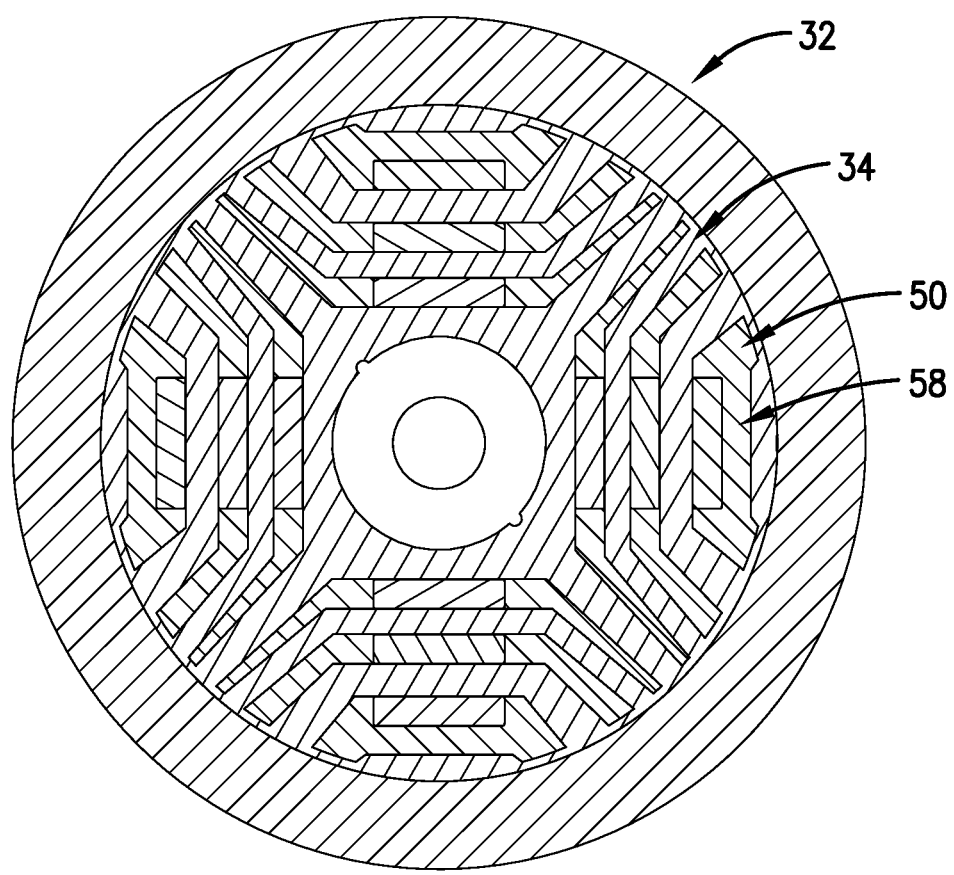
FIG. 6A is a cross-sectional plan view of a second implementation of the conductor cage component of the motor of FIG. 2.
Figure 6B:
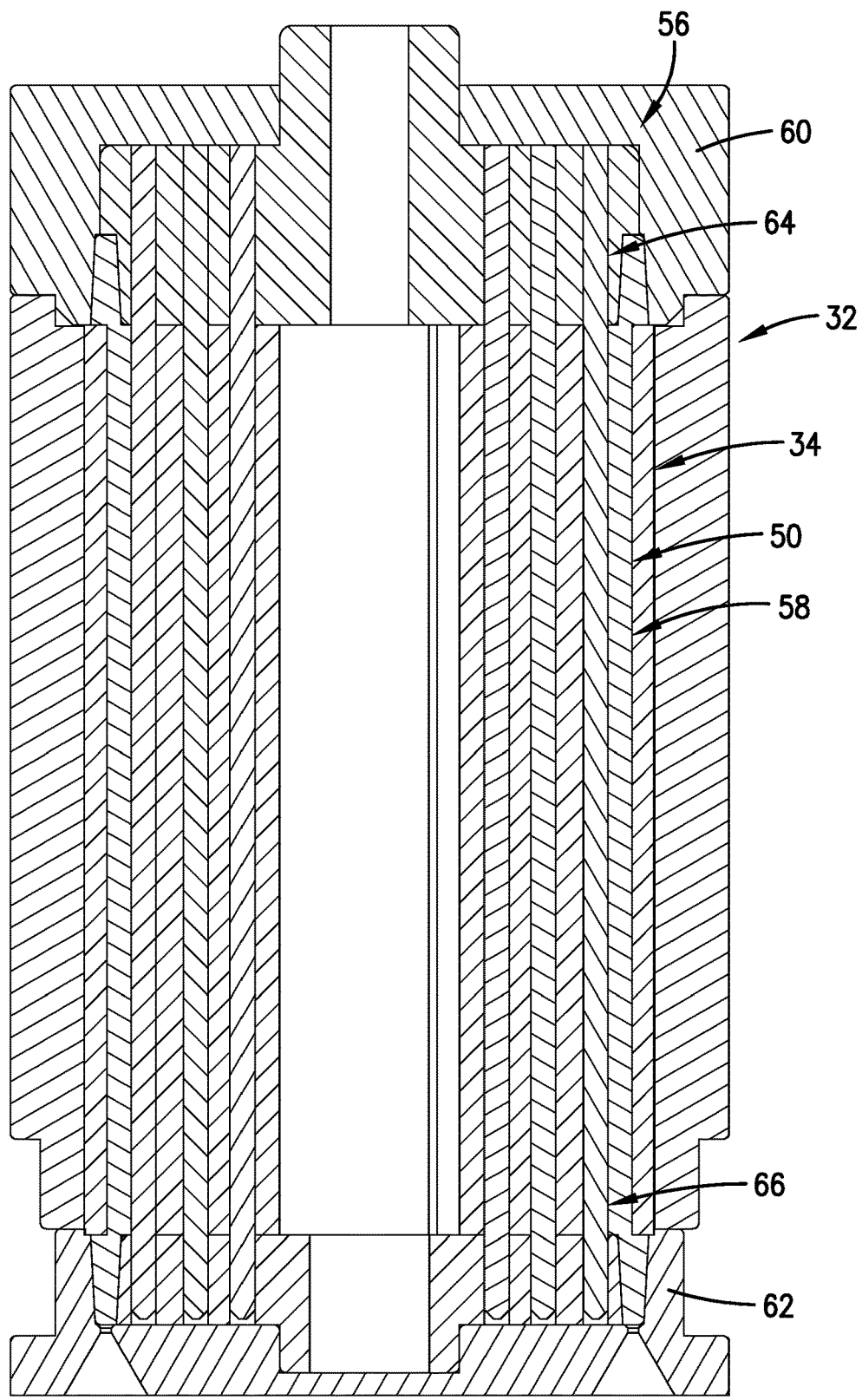
FIG. 6B is a cross-sectional elevation view of the second implementation of the conductor cage component of the motor of FIG. 6A.

In one implementation, as seen in FIGS. 3, 5A, and 6A, each barrier slot 50 may have the cross-sectional shape of a substantially continuous curve, while in another implementation, shown in FIGS. 4A-4H, one or more of the barrier slots 50 may have the cross-sectional shape of a portion of such a curve interrupted by one or more walls (or "webs") 52.

The rotor 34 may include a conductive cage 56 which forms part of a synchronous reluctance magnetic circuit. The conductive cage 56 may include a plurality of conductive rotor bars 58 and first and second conductive end rings 60, 62. The plurality of conductive rotor bars 58 may take the form of a conductive material located in some or all of the barrier slots 50 so as to extend longitudinally between first and second ends 64, 66 through each quadrant Q1, Q2, Q3, Q4 of the rotor 34. In one implementation, the conductive material may be poured, injected, or otherwise introduced in a molten or semi-molten state into the barrier slots 50 to create the plurality of curved, spaced-apart conductive rotor bars 58 extending longitudinally through each quadrant Q1, Q2, Q3, Q4 and in parallel with the axis L. The conductive rotor bars 58 may have the additional effect of increasing the structural integrity of the rotor 34. The first and second conductive end rings 60, 62 may be located at longitudinally opposite ends of the rotor 34 and in electrical contact with the respective first and second ends 64, 66 of the conductive rotor bars 58. In operation, the conductive cage 56 engages at start-up until synchronicity is achieved, during which time the synchronous reluctance motor 22 acts generally like an induction motor, and then the conductive cage 56 becomes generally operationally transparent until and unless synchronicity is lost in which case it engages again.

In one implementation, shown in FIGS. 4A and 4E-4H, the rotor 34 may further include one or more magnetic rotor bars 70 in the form of magnetic material located, like the conductive rotor bars 58, in one or more but not all of the curved space-apart barrier slots 50 of each quadrant Q1, Q2, Q3, Q4. In another implementation, one or more but less than all of the barrier slots 50 (for example, the slots 50 in which the magnetic rotor bars 70 are shown) may be left unfilled by either a conductive or a magnetic material.

The VFD controller 24 may be configured to control a speed and a torque of the one or more synchronous reluctance motors 22 by varying a motor input frequency and a voltage in an open-loop mode by adjusting the voltage magnitude of an inverter's output to the motor 22 to match a required load torque in a V/Hz relationship. In one implementation, the VFD controller 24 may include a solid-state power electronics conversion system comprising a rectifier bridge converter 72, a direct current (DC) link 74, and the aforementioned inverter 76. In one implementation, the VFD controller 24 may use substantially any suitable VFD controller technology, including otherwise conventional VFD controller technology and off-the-shelf V/Hz control such as is commonly used for induction motors.

The operator interface 26 may be configured to facilitate an operator starting, stopping, and adjusting the motor speed and/or motor torque of each of the one or more synchronous reluctance motors 22. The system 20 may also be controlled by a programmable logic controller through Modbus or a similar interface. Additional operator control functions may include reversing and switching between manual speed adjustment and automatic control from an external process control signal. The operator interface 26 may include an alphanumeric display or indication lights and meters to provide information about the operation of the VFD motor drive 20. In one implementation of the operator interface, 26, a keypad and display unit may be provided on the front of the VFD controller 24. The keypad display may be cable-connected and mounted a short distance from the VFD controller 24. The operator interface 26 may also include input and output (I/O) terminals for connecting push buttons, switches, and other operator interface devices or control signals. A serial communications port may also be available to allow the VFD motor drive 20 to be configured, adjusted, monitored, and controlled using a computer.

In an example implementation and operation, during start-up the inverter 76 of the VFD controller 24 may apply a constant frequency of approximately between five Hertz and ten Hertz. Currents may be induced in the conductive rotor bars 58 depending on the difference between the rotor 34 and the supply frequency or slip frequency, similar to an induction motor. When the slip frequency is approximately zero Hertz, the rotor 34 is synchronized and will continue to accelerate as the inverter output frequency is increased. However, as a result of load variations, the slip frequency will not always be zero Hertz and desynchronization or pull-out may occur. During these events, currents are induced in the conductive rotor bars 58 causing the rotor 34 to pull back into synchronicity. The conductive cage 56 is configured so that the rotor 34 will tend to pull back into synchronization during load variations. In order to accomplish this, the conductive cage 56 may have different electrical resistances in the direct and quadrature rotor axes D, Q. The optimization of these resistances enables stable operation for single and multiple motor loads. A conventional induction motor cage will have bars which have equiangular spacing around the rotor periphery, in which case the resistance of the direct and quadrature rotor axes are equal. In embodiments of the present invention, the conductive rotor bars 58 may be spaced according to the angular positions of the rotor flux barrier slots 50 which are an integral part of the synchronous motor design. As a result, the difference between the resistances of the direct and quadrature rotor axes D, Q can be better controlled.

Figure 7:
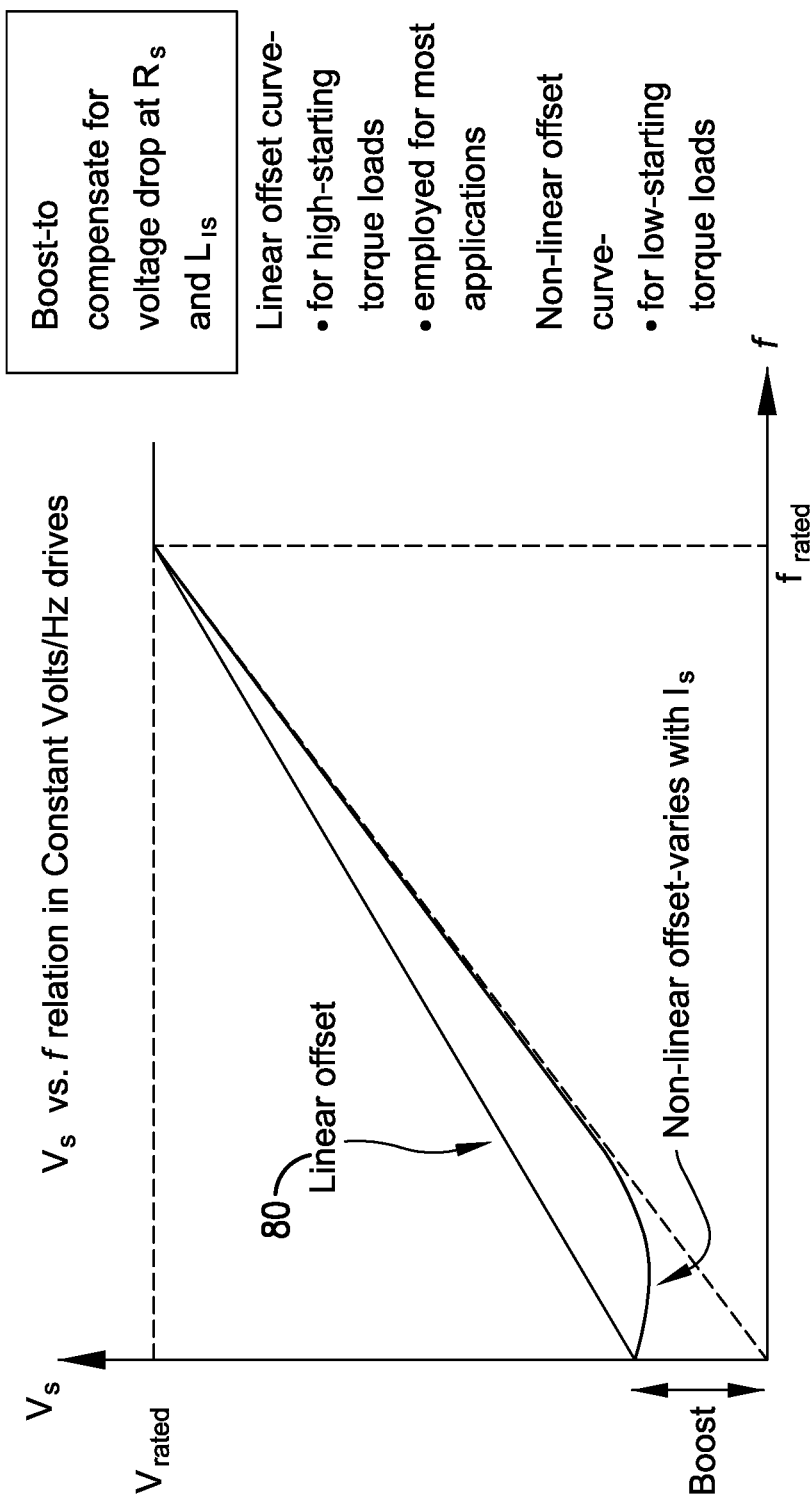
FIG. 7 is a plot of voltage versus frequency in an example volts-per-Hertz control of the motors as may be implemented by the single variable frequency drive controller component of the system of FIG. 1.
Figure 8A:
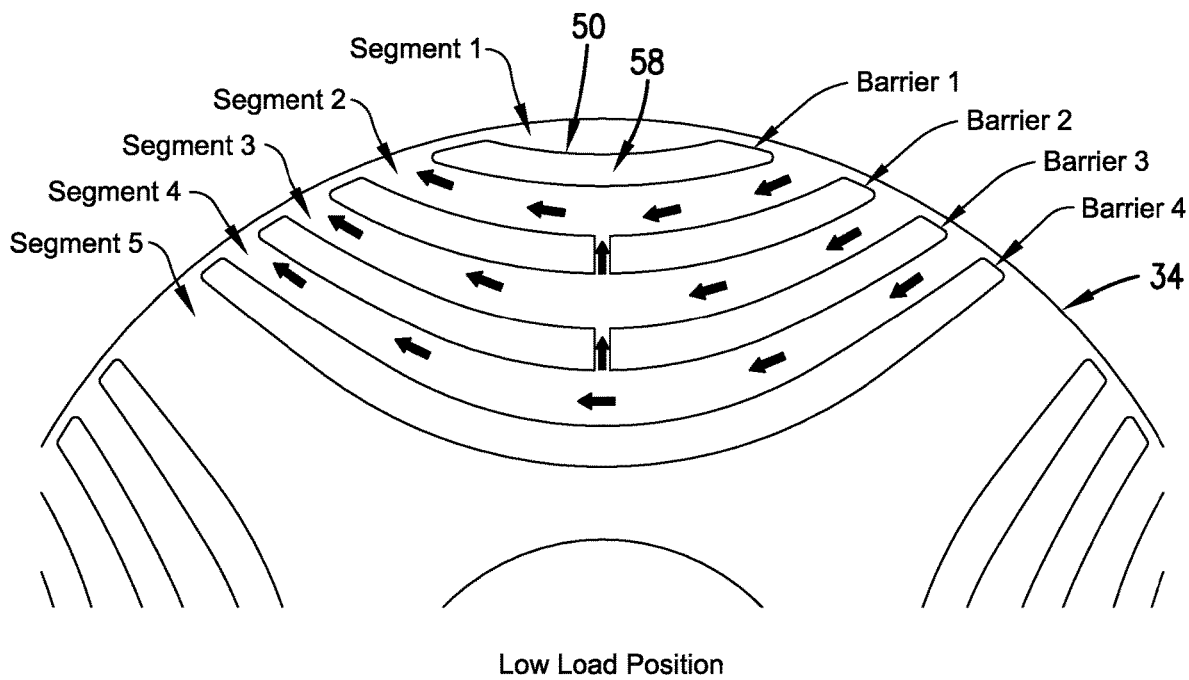
FIG. 8A is a fragmentary cross-sectional plan view of an example implementation of the rotor component of the motor of FIG. 2 operating in a low load condition.
Figure 8B:
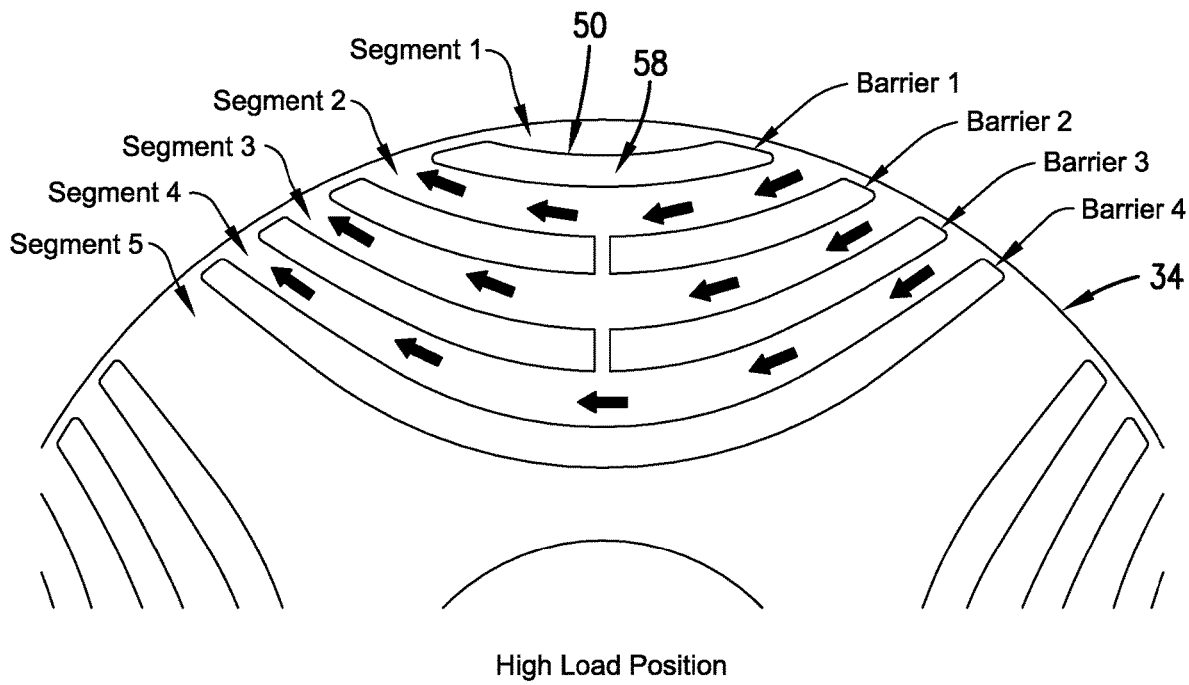
FIG. 8B is a fragmentary cross-sectional plan view of the example implementation of the rotor component of the motor of FIG. 2 operating in a high load condition.

Referring also to FIG. 7, for a normal V/f control relationship 80, the lower the frequency, the lower the applied voltage. In an example variable torque application with V/Hz control, the voltage magnitude of the output of the inverter 76 to the motor 22 may be adjusted to match the required load torque in a linear V/Hz relationship. For example, for 460 V, 60 Hz motors, this linear V/Hz relationship may be 460/60=7.67 V/Hz. Additionally or alternatively, the VFD controller 24 may be configured to operate in quadratic V/Hz mode or may be programmed to suit special multi-point V/Hz paths. Space vector pulse-width modulation (SVPWM), sinusoidal PWM (SPWM), or similar technologies may be used to vary the VFD motor drive's motor voltage (or current) and frequency. With SPWM control, quasi-sinusoidal, variable-pulse-width output is constructed from intersections of a saw-toothed carrier signal with a modulating sinusoidal signal which is variable in operating frequency as well as in voltage (or current). In order to maintain stable operation of the synchronous reluctance motor 22, the maximum current angle should be less than forty-five degrees.

Normally, when a line-start synchronous reluctance motor designed for fixed-speed operation is operated with a VFD controller at a certain frequency and tends toward instability, then it needs to increase the voltage command to a level at which the system is stable. Further, normally the Ld/Lq value is higher at the low load condition. However, this may not be optimal for operation with the VFD controller because, as discussed, the voltage would be decreased when the frequency is decreased, and it also implies that the load is decreased for the application of the, for example, fan, pump, and compressor. In the present invention, the rotor 34 of the synchronous reluctance motor 22 is configured to reshape the Ld/Lq profile so that the rotor 34 is suitable for operation with the VFD controller 24. However, it may be desirable that the reshaping of the rotor 34 to modify the Ld/Lq profile keep the high efficiency level around the rated load condition.

Figure 9A:
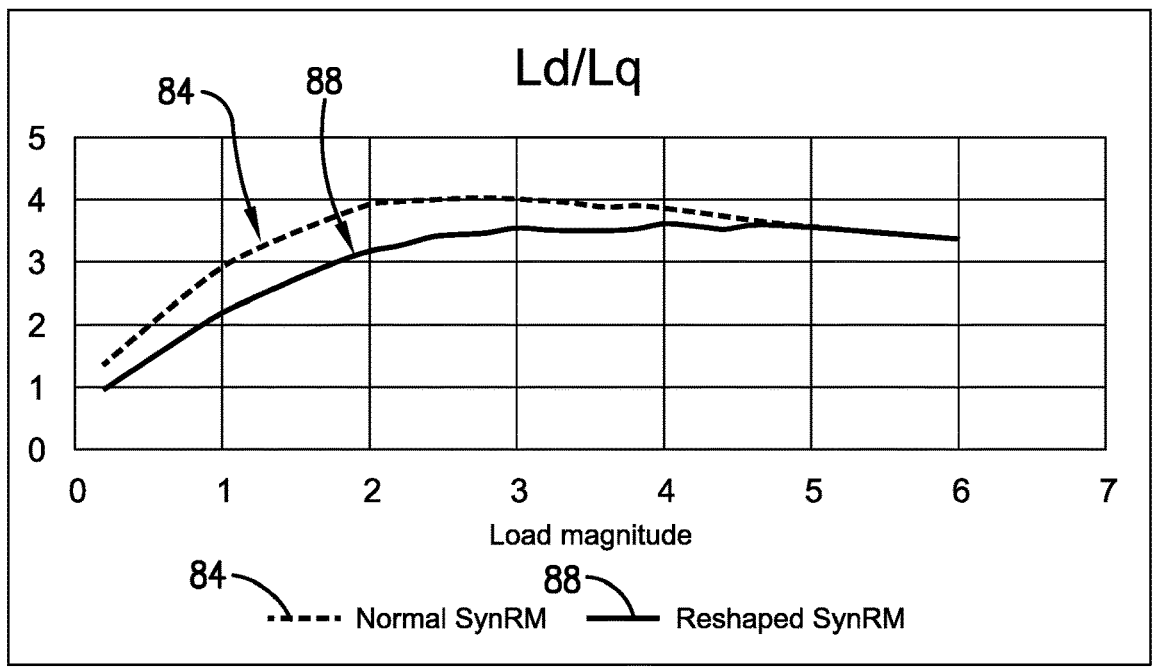
FIG. 9A is a graph of Ld/Lq both for a conventional synchronous reluctance motor and an implementation of the synchronous reluctance motor of the present invention.
Figure 9B:
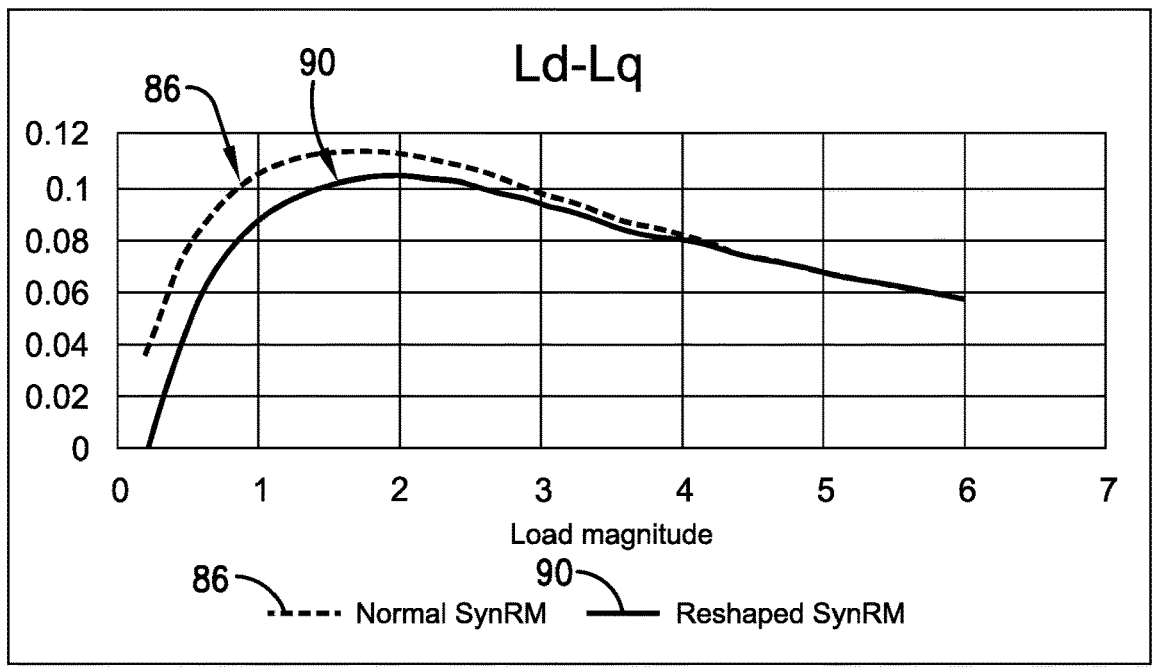
FIG. 9B is a graph of Ld-Lq both for a conventional synchronous reluctance motor and an implementation of the synchronous reluctance motor of the present invention.

Referring also to FIGS. 8A, 8B, 9A, and 9B, a normal rotor has four barriers in one pole, and in a magnetic field the flux travels along the segment without regard to the magnitude of the magnetic field. The corresponding Ld/Lq 84, Ld–Lq 86 of the normal rotor is shown in FIGS. 9A and 9B. However, if some flux leakage paths can be provided at the second and third inner barrier slots when the magnetic field is not very strong, then the flux at the third and fourth segments can flow to the second and third segments to weaken the reluctance. However, the width of these flux leakage paths can be controlled so that when the magnetic field is increased to the rated load condition the flux leakage path would be saturated and block the leakage flux. The corresponding Ld/Lq 88, Ld–Lq 90 of the present rotor 34 is also shown in FIGS. 9A and 9B. Thus, though the Ld/Lq is decreased in the low excited magnetic field condition, the reduction amount on the Ld–Lq is not very large.

With regard to the reshaped rotor 34 with the flux leakage path in the barrier, for a rotor with N barriers the first barrier is at the outer-most side of the rotor, the Nth barrier is at the inner-most side, and the number of flux leakage paths should not exceed N−1. The first barrier may not be set to any flux leakage path in order to maintain its high efficiency. The Nth barrier may not be set to any flux leakage path or at most to only one flux leakage path with width as small as possible and less than that of the other flux leakage paths. The priority for setting the flux leakage path is N−1>N−2> . . . >N>>>>>1. Examples of flux leakage path arrangements are shown in FIGS. 4A-4H.

The resulting synchronous reluctance motor 22 can be operated with the VFD controller 24 using a linear V/Hz relationship setting without specific parameter estimation or tuning. Because it is a synchronous motor, the motor 22 is operated at synchronous speed without slip and second rotor copper loss. It provides high efficiency even though most of the components, including the VFD controller 24 and the stator 32, may be similar to those used with a traditional induction motor, so that the VFD motor system 20 provides a low cost alternative to and easy replacement of traditional induction motors.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

The invention claimed is:

1. A variable frequency drive motor system comprising:
   one or more synchronous reluctance motors, each synchronous reluctance motor including a stator and a rotor, and each rotor including—
      a longitudinal axis and four quadrants circumferentially arranged about the longitudinal axis,
      a plurality of curved, spaced-apart barrier slots contained within each quadrant and extending parallel to the longitudinal axis, and
      a conductive cage including—
         a conductive material located in at least some of the plurality of curved, spaced-apart barrier slots to create a plurality of curved, spaced-apart conductive rotor bars contained within each quadrant and extending parallel to the longitudinal axis between a first end and a second end, and
         first and second conductive end rings located at longitudinally opposite ends of rotor, with the first conductive end ring in electrical contact with the first end of the plurality of curved, spaced-apart conductive rotor bars and the second conductive end ring in electrical contact with the second end of the plurality of curved spaced-apart conductive rotor bars; and
   a variable frequency drive controller including an inverter and configured to control a motor speed and a motor torque of the one or more synchronous reluctance motors by varying a motor input frequency and a voltage in an open-loop mode by adjusting the voltage magnitude of an output of the inverter to each synchronous reluctance motor to match a required load torque in a volts-per-Hertz relationship.

2. The variable frequency drive motor system of claim 1, wherein the variable frequency drive motor system is incorporated into a variable torque heating, ventilation, and air conditioning application and drives a load.

3. The variable frequency drive motor system of claim 1, wherein each curved, spaced-apart conductive rotor bar is a continuous curve.

4. The variable frequency drive motor system of claim 1, wherein each curved, spaced-apart conductive rotor bar is a portion of a curve interrupted by one or more walls.

5. The variable frequency drive motor system of claim 1, wherein there are at least three curved, spaced-apart conductive rotor bars in each quadrant.

6. The variable frequency drive motor system of claim 5, wherein there are between three and seven curved, spaced-apart conductive rotor bars in each quadrant.

7. The variable frequency drive motor system of claim 1, further including a magnetic rotor bar located in one or more of the curved, spaced-apart barrier slots in each quadrant.

8. The variable frequency drive motor system of claim 1, wherein the variable frequency controller further includes a rectifier bridge converter and a direct current link.

9. The variable frequency drive motor system of claim 1, further including an operator interface configured to facilitate an operator starting, stopping, and adjusting the motor speed of each synchronous reluctance motor.

10. A variable frequency drive motor system comprising:
    a plurality of synchronous reluctance motors, each synchronous reluctance motor including a stator and a rotor, and each rotor including— a longitudinal axis and four quadrants circumferentially arranged about the longitudinal axis, and a plurality of curved, spaced-apart barrier slots contained within each quadrant and extending parallel to the longitudinal axis, and a conductive cage including— a conductive material located in at least some of the plurality of curved, spaced-apart barrier slots to create at least three curved, spaced-apart conductive rotor bars contained within each quadrant and extending parallel to the longitudinal between a first end and a second end, and first and second conductive end rings located at longitudinally opposite ends of the rotor, with the first conductive end ring in electrical contact with the first end of the at least three curved, spaced-apart conductive rotor bars and the second conductive end ring in electrical contact with the second end of the at least three curved, spaced-apart conductive rotor bars; and a variable frequency drive controller including an inverter and configured to control a motor speed and a motor torque of each of the synchronous reluctance motors by varying a motor input frequency and a voltage in an open-loop mode by adjusting the voltage magnitude of an output of the inverter to each synchronous reluctance motor to match a required load torque in a volts-per-Hertz relationship.

11. The variable frequency drive motor system of claim 10, wherein the variable frequency drive motor system is incorporated into a variable torque heating, ventilation, and air conditioning application and drives a load.

12. The variable frequency drive motor system of claim 10, wherein each curved, spaced-apart conductive rotor bar is a continuous curve.

13. The variable frequency drive motor system of claim 10, wherein each curved, spaced-apart conductive rotor bar is a portion of a curve interrupted by one or more walls.

14. The variable frequency drive motor system of claim 10, wherein there are between three and seven curved, spaced-apart conductive rotor bars in each quadrant.

15. The variable frequency drive motor system of claim 10, further including a magnetic rotor bar located in one or more of the curved, spaced-apart barrier slots in each quadrant.

16. The variable frequency drive motor system of claim 10, wherein the variable frequency controller further includes a rectifier bridge converter and a direct current link.

17. The variable frequency drive motor system of claim 10, further including an operator interface configured to facilitate an operator starting, stopping, and adjusting the motor speed of each synchronous reluctance motor.

18. A variable frequency drive motor system comprising:

a plurality of synchronous reluctance motors, each synchronous reluctance motor including a stator and a rotor, and each rotor including— a longitudinal axis and four quadrants circumferentially arranged about the longitudinal axis, a plurality of curved, spaced-apart barrier slots contained within each quadrant and extending parallel to the longitudinal axis, and a conductive cage including— a conductive material located in at least some of the plurality of curved, spaced-apart barrier slots to create a plurality of curved, spaced-apart conductive rotor bars contained within each quadrant and extending parallel to the longitudinal axis between a first end and a second end, and first and second conductive end rings located at longitudinally opposite ends of rotor, with the first conductive end ring in electrical contact with the first end of the plurality of curved, spaced-apart conductive rotor bars and the second conductive end ring in electrical contact with the second end of the plurality of curved spaced-apart conductive rotor bars, wherein there are between three and seven curved, spaced-apart conductive rotor bars in each quadrant;

a single variable frequency drive controller including an inverter and configured to control a motor speed and a motor torque of each of the synchronous reluctance motors by varying a motor input frequency and a voltage in an open-loop mode by adjusting the voltage magnitude of an output of the inverter to each synchronous reluctance motor to match a required load torque in a volts-per-Hertz relationship; and an operator interface configured to facilitate an operator starting, stopping, and adjusting the motor speed of each synchronous reluctance motor.

19. The variable frequency drive motor system of claim 18, wherein the variable frequency drive motor system is incorporated into a variable torque heating, ventilation, and air conditioning application and drives a load.

20. The variable frequency drive motor system of claim 18, further including a magnetic rotor bar located in one or more of the curved, spaced-apart barrier slots in each quadrant.

* * * * *